Aug. 30, 1966 R. J. BERTLING ETAL 3,269,754

INTERNAL PLASTIC COUPLING

Filed March 2, 1964

INVENTORS.
MIKE P. CRIVELLO
RONALD J. BERTLING
BY
Robert W. Raththurn
ATTORNEY.

United States Patent Office 3,269,754
Patented August 30, 1966

3,269,754
INTERNAL PLASTIC COUPLING
Ronald J. Bertling, Grafton, and Mike P. Crivello, St. Francis, Wis., assignors to McGraw-Edison Company, Milwaukee, Wis., a corporation of Delaware
Filed Mar. 2, 1964, Ser. No. 348,620
2 Claims. (Cl. 285—109)

This invention relates to couplings and more particularly to internal couplings for securing unthreaded conduit members.

It is often desired to interconnect conduit sections, such as for example bituminized fibre tube, without utilizing a coupling that extends radially outward beyond outside diameter of the conduit. Equally important is to provide a device that can be utilized for field assembly that does not require special tools for preparing the conduit end whether to provide threads or a tapered finished end. In addition, for any device that meets these requirements to be acceptable for general use, the obstruction presented by the projection of such coupling into the conduit must be minimal both with respect to a reduction of the internal diameter or surface irregularities.

The applicants have provided a resilient internal coupling that can be used with a conduit having no more preparation than a squarely sawed end. The coupling portion that extends within the conduit is of relatively thin material and of such construction that as it is inserted into the conduit the annular distal edge of the coupling is expanded outwardly into intimate compressive contact with the inside surface of the conduit minimizing the radially inward projection of the coupling and as closely as possible approximating a continuous uninterrupted conduit surface.

It is an object of this invention to provide a conduit coupling that does not extend beyond the outside diameter of the associated conduit.

It is also an object of this invention to provide an internal coupling that causes a minimum of internal restriction to the passage of fluids or objects through the conduit.

It is a further object of this invention to provide a coupling or connecting device requiring no special tools for the preparation of the associated conduit ends.

It is also an object of this invention to provide a coupling or connector that will utilize the "cold flow" properties of such materials as bituminized fibre conduit to enhance the coupling engagement therebetween.

These and other objects and advantages of this invention will become apparent from the following description taken in connection with the accompanying drawings wherein.

Figure 1:
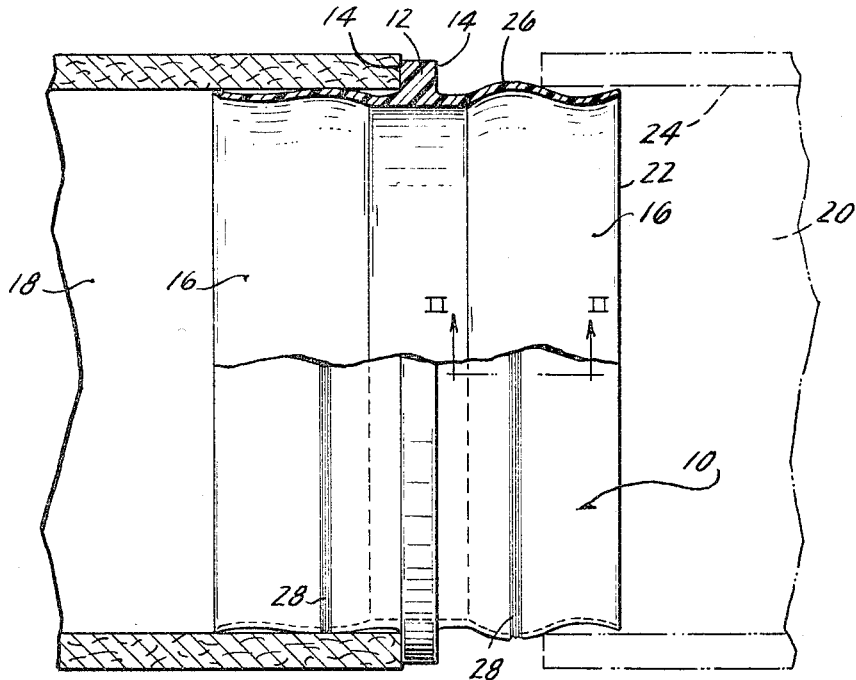
FIG. 1 is an axial side view of the coupling of this invention partially broken away and partially in section shown with sections associated conduit portions.

Referring to FIG. 1 the coupling 10 presents a radially outwardly extending annular portion 12 which has abutment surfaces 14 which limit the extension of the axial end portions 16 of the coupling into the associated conduit portions 18, 20. The distal annular edge 22 of coupling 10 has an exterior diameter which is slightly less than the diameter of the inside surface 24 of the conduit to which it will be connected. Intermediate the annular distal edge 22 and the cooperating abutment surface 14 is an axial corrugation which presents a ridge 26 having a maximum exterior diameter slightly greater than the diameter of the associated conduit interior surface 24. The undulated coupling portion is of substantially constant thickness with the exception of a taper along the edge 22 which is provided to minimize the effect of such edge as an obstruction in the coupled condition.

Figure 2:
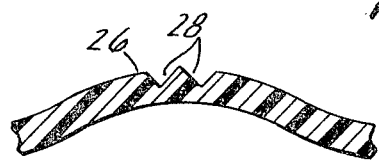
FIG. 2 is a partial section view taken along line II—II of FIG. 1.
Figure 3:
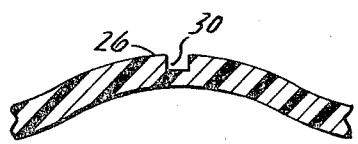
FIG. 3 is a view similar to FIG. 2 showing an alternate embodiment.

A series of annular serrations 28, as more clearly shown in FIG. 2, is formed on the ridge 26. This surface irregularity provided to enhance the coupling engagement with the conduit interior surface may take the alternate form of a notch 30 as shown in FIG. 3.

The associated conduit portions require no preparation other than having a squarely sawed end. No treatment is required of the exterior or interior cylindrical surfaces. The coupling is installed simply by forcing the axial end portion 16 thereof into the interior of the conduit until the conduit end abuts the surface 14. The distal annular edge 22 being of smaller diameter will freely enter the conduit as shown at the right side of FIG. 1. The ridge 26 being of slightly greater exterior diameter than the interior surface 24 of the conduit will be compressed radially inwardly as it is forced into the conduit and simultaneously therewith the distal edge 22 will be expanded radially outwardly and forced into intimate compressive contact with the interior surface of the conduit. In the position of full coupling engagement shown at the left side of FIG. 1, it will be noted that as the ridge 26 is compressed radially inwardly and the flared distal edge 22 is confined by contact with the inside surface 24 of the conduit the internal surface of the coupling approaches a cylindrical configuration to thereby minimize the surface irregularities or undulations of the installed axial end portion 16 and reduce the likelihood that the coupling would cause an obstruction in the conduit line.

In the fully installed condition, as shown at the left side of FIG. 1, the ridge 26 and the annular edge 22 are both in intimate compressive coupling contact with the interior conduit surface. The serrations or other irregularities formed in the ridge 26 afford a normally more binding contact with the conduit, but when used with a material such as bituminized fibre conduit wherein "cold flow" will occur, after being subjected to pressure for a period of time the material of the conduit will tend to flow into the annular recesses to markedly increase the coupling effect between coupling and conduit.

Although but one embodiment has been shown and described, it will be apparent to those skilled in the art that various changes and modifications may be made therein without departing from the spirit of the invention or from the scope of the appended claims.

What is claimed is:
1. An internal coupling for interconnecting unthreaded conduit sections formed of a single piece of resilient plastic material comprising a cylindrical central portion having a radially outwardly extending annulus presenting radial abutment surfaces; axially extending end portions of generally circular cross section and substantially constant thickness having axial undulations, each such end portion terminating at its distal end in a diverging portion with the maximum peripheral diameter thereof less than the inside diameter of said conduit sections with a diverging converging section adjacent said distal portion and intermediate said distal portion and said central portion presenting a peripheral ridge surface having a maximum diameter greater than said inside diameter of said conduit sections whereby as said conduit sections are respectively extended over said end portions toward abutment with said radial surfaces of said annulus the distal ends freely enter said respective conduit section and are thereafter forced radially outwardly into compressive contact with the interior surfaces of said conduit sections as said respective conduit sections force said diverging converging portions radially inwardly and annular serrations formed in said peripheral ridge surface.

2. In combination with a pair of conduit end portions each having an interior cylindrical surface with a first diameter, an internal coupling comprising a pair of resilient deformable coupling portions of substantially uniform thickness and of generally circular cross section extending in each axial direction from a radially outwardly extending annulus which presents radial abutment surfaces facing in each axial direction; each said coupling portion having axial undulations including a diverging distal end and a diverging converging section intermediate said annulus and said distal end, the maximum diameter of said distal end being less than said first diameter of a cooperating conduit end portion and the maximum peripheral diameter of said diverging converging section being greater than said first diameter of such cooperating conduit end portion whereby as said conduit end portion is extended axially over said coupling portion toward abutment with said radial surface of said annulus the distal end freely enters said conduit end portion and is thereafter forced radially outwardly into compressive contact with said interior cylindrical surface as said diverging converging section is forced radially inwardly by constrictive engagement with said interior cylindrical surface forming an annular surface of contact therebetween.

References Cited by the Examiner

UNITED STATES PATENTS

| | | | |
|---|---|---|---|
| 1,302,022 | 4/1919 | Drewry | 285—107 |
| 1,811,277 | 6/1931 | Mosley | 285—398 X |
| 2,207,518 | 7/1940 | Moser | 285—109 |
| 2,366,814 | 1/1945 | Smith | 285—110 |
| 2,476,079 | 7/1949 | Benjamin | 285—235 |
| 2,726,103 | 12/1955 | Slattery | 285—235 X |
| 2,772,931 | 12/1956 | Biedermann | 277—203 X |
| 2,871,034 | 1/1959 | Wiltse | 285—235 X |

FOREIGN PATENTS 627,278   8/1949   Great Britain.

CARL W. TOMLIN, *Primary Examiner.*

EDWARD C. ALLEN, THOMAS F. CALLAGHAN,
*Examiners.*